United States Patent [19]
Yamazaki

[11] Patent Number: 6,028,829
[45] Date of Patent: Feb. 22, 2000

[54] INFORMATION READING DEVICE FOR OPTICAL DISK WITH UNRECORDED REGION DETECTOR

[75] Inventor: Seiichi Yamazaki, Tokorozawa, Japan

[73] Assignee: Pioneer Electronic Corporation, Tokyo, Japan

[21] Appl. No.: 07/775,148

[22] Filed: Oct. 9, 1991

[30] Foreign Application Priority Data

Oct. 12, 1990 [JP] Japan .................................. 2-273731

[51] Int. Cl.$^7$ ....................................................... G11B 7/00
[52] U.S. Cl. ........................... 369/54; 369/58; 369/32; 369/124
[58] Field of Search ............................ 369/54, 58, 59, 369/47, 48, 32, 121, 124, 44.32, 44.25–44.28

[56] References Cited

U.S. PATENT DOCUMENTS

| | | | |
|---|---|---|---|
| 4,484,318 | 11/1984 | Morita | 369/33 |
| 5,134,607 | 7/1992 | Fuji et al. | 369/124 |
| 5,140,573 | 8/1992 | Ando | 369/44.28 |

*Primary Examiner*—Nabil Hindi
*Attorney, Agent, or Firm*—Kane, Dalsimer, Sullivan, Kurucz, Levy, Eisele and Richard, LLP

[57] ABSTRACT

An information reading device for an optical disk has a peak level detector, a coupling capacitor, a comparator, and a resetting circuit. The comparator produces an on-track signal based on a detected peak signal from the peak level detector. Information tracks on the optical disk are searched based on a count of pulses of the on-track signal. The resetting circuit has a boundary detector and a switching circuit. The boundary detector produces a boundary signal indicative of the boundary between recorded and unrecorded regions on the optical disk. In response to the boundary signal, the switching circuit discharges stored charges of the coupling capacitor in the unrecorded region, causing detected peak signals in the recorded and unrecorded region to vary in amplitude across a common reference level.

7 Claims, 3 Drawing Sheets

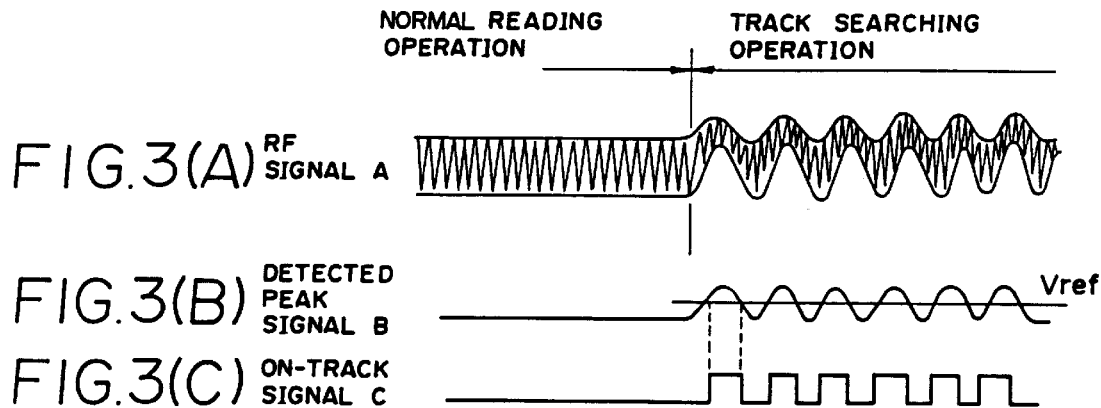
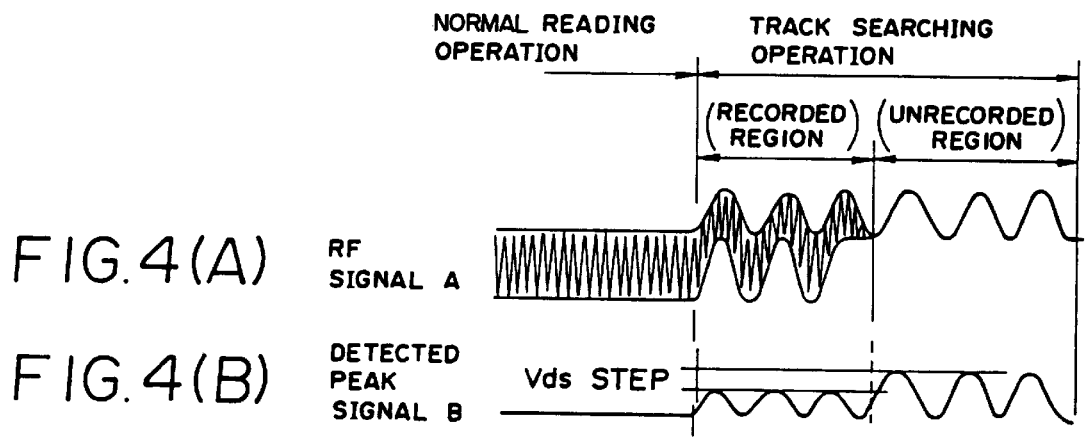

FIG. 5
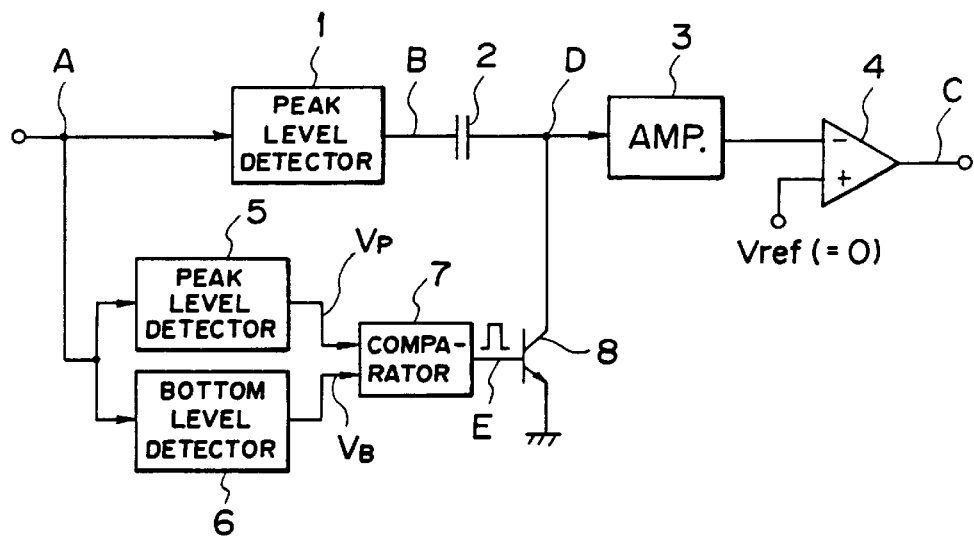
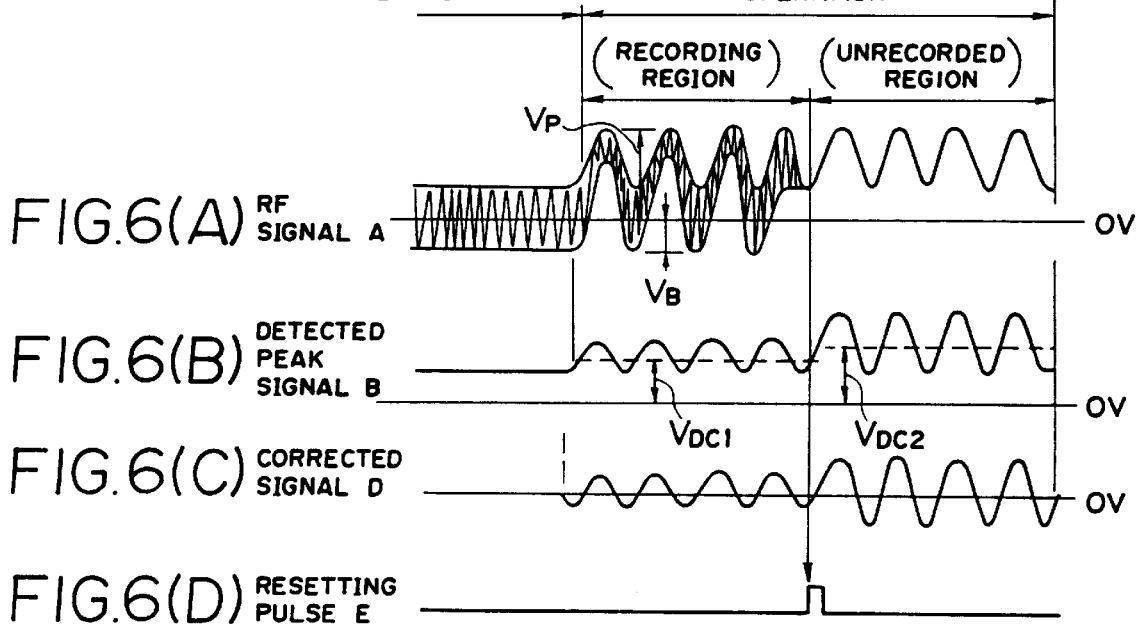
FIG.6(A) RF SIGNAL A
FIG.6(B) DETECTED PEAK SIGNAL B
FIG.6(C) CORRECTED SIGNAL D
FIG.6(D) RESETTING PULSE E

INFORMATION READING DEVICE FOR OPTICAL DISK WITH UNRECORDED REGION DETECTOR

BACKGROUND OF THE INVENTION

1. Field of the Invention

The present invention relates to a device for reading information from an optical disk on which information can be recorded, such as a WORM (Write Once Read Many) optical disk, and more particularly to a track crossing detector for detecting a traversing or crossing motion across a track for tracking searching operation.

2. Description of the Prior Art

Information storage optical disks include a WORM optical disks on which information can be recorded only once. Various mechanisms have been proposed to record desired information on a WORM optical disk. One optical disk with a new information recording mechanism is known as a dye optical disk. When a laser beam is applied to the dye optical disk, a disk region where the laser beam spot is applied is discolored or deformed to provide a different reflectance from the reflectance of another disk region. Therefore, the discolored or deformed disk region functions as a signal pit. Optical disk of this kind a narrow land on its surface which serves as information tracks, which will be described in detail with reference to FIG. 1 of the accompanying drawings.

As shown in FIG. 1, a WORM optical disk 9 has a narrow spiral land 10 on its recording surface, the spiral land 10 being spirally extending from the inner circumferential side toward the outer circumferential side of the disk. The recording surface of the optical disk 9 also includes a spiral groove 11 defined between successive turns of the spiral land 10, and, as a result, has a zigzag-shaped cross section in the radial direction of the optical disk 9. The recording surface with the land 10 and the groove 11 is given a mirror finish for a higher reflectance with respect to the applied laser beam. The land 10 has, on its upper surface, recorded pits 12 alternating with normal surface regions 13, the recorded pits 12 having a lower reflectance than that of the normal surface regions 13. Therefore, the successive turns of the spiral land 10 with the recorded pits 12 serve as information tracks.

The information that is recorded in the form of the recorded pits 12 on the information tracks of the WORM optical disk 9 can be read by an information reading device. The information reading device has an optical pickup (not shown) for optically reading the recorded pits 12 based on the intensity of a reflected laser beam from the optical disk 9, and an RF detector circuit for detecting the envelope of a read signal (hereinafter referred to as an "RF signal") and supplying the detected envelope to a demodulator. The RF detector circuit has a track crossing detector for searching the recorded information at high speed. One conventional form of track crossing detector is illustrated in FIG. 2.

When the optical pickup moves at high speed radially over the optical disk 9, i.e., jumps over the tracks of the optical disk 9, the track crossing detector counts amplitude variations of the RF signal due to the alternating occurrence of the land 10 and the groove 11 thereby to determine the number of information tracks that the optical pickup has traversed. As shown in FIG. 2, the track crossing detector has a peak level detector 1 for detecting the peak level of the amplitude of the RF signal, denoted at A. The peak level detector 1 has an output terminal connected through a coupling capacitor 2 to an amplifier 3 that amplifies a detected peak signal B from the peak level detector 1. The coupling capacitor 2 serves to cut off a DC component contained in the peak level signal B and passes only an AC component contained in the peak level signal B. The amplifier 3 has an output terminal coupled to an inverting input terminal of a comparator 4. A reference voltage $V_{REF}$ is applied to a noninverting input terminal of the comparator 4. The reference voltage $V_{REF}$ may be a ground potential, for example. The comparator 4 produces an on-track signal C indicative of track count pulses at its output terminal.

Operation of the track crossing detector shown in FIG. 2 will be described below with reference to FIGS. 3(A) through 3(C). During normal reading operation, the optical pickup traces the land 10 while the optical disk 9 is rotating at a predetermined speed. The optical pickup applies an RF signal A whose envelope is substantially uniform, as shown in FIG. 3(A), to the peak level detector 1. As a result, the peak level detector 1 produces a constant detected peak signal B as shown in FIG. 3(B), and the comparator 4 produces a constant on-track signal C as shown in FIG. 3(C). During track searching operation, the optical pickup moves at a certain speed radially over the optical disk 9. At this time, the optical pickup produces an RF signal A whose envelope varies depending on the alternating occurrence of the land 10 and the groove 11, as shown in FIG. 3(A). The envelope of the RF signal A varies because the intensity of the reflected laser beam varies as the optical pickup travels alternately across the land 10 and the groove 11. Consequently, the peak level detector 1 detects successive peak levels of the RF signal A, and generates a detected peak signal B indicative of the varying envelope, as shown in FIG. 3(B). The detected peak signal B is applied through the coupling capacitor 2 and the amplifier 3 to the comparator 4. The comparator 4 compares the detected peak signal B with the reference voltage $V_{REF}$. With the reference voltage $V_{REF}$ being selected at a suitable level, the comparator 4 produces at its output terminal an on-track signal C that represents pulses corresponding to the respective amplitude variations of the detected peak signal B. Since the pulses of the on-track signal C correspond respectively to the turns of the land 10, i.e., the information tracks traversed by the optical pickup, the number of information tracks that the optical pickup has jumped over can be determined by counting the pulses of the on-track signal C. The above description applies to the detection of information tracks on which information has already been recorded, typically on ordinary optical disks, such as CD, LVD, etc.

Information may not necessarily have been recorded on some information tracks on the WORM optical disk 9. For example, as shown in FIG. 1, the recorded pits 12 are formed on some information tracks, and no recorded pits are formed on other information tracks. The WORM optical disk 9, therefore, contains a recorded regions AW and an unrecorded region NW. In FIGS. 4(A) and 4(B), during normal reading operation, the track crossing detector operates in the same manner as shown in FIGS. 3(A) and 3(B). During track searching operation, however, the RF signal A and the detected peak signal B shown in FIGS. 4(A) and 4(B) have different waveforms from those shown in FIGS. 3(A) and 3(B). More specifically, insofar as the optical pickup jumps over information tracks in the recorded region AW, the RF signal A shown in FIG. 4(A) is the same as the RF signal A shown in FIG. 3(A). However, when the optical pickup starts to jump over information tracks in the unrecorded region NW, the signal produced by the optical pickup does not contain any RF signal component from the boundary between the recorded and unrecorded regions AW, NW because no recording bits 12 exist on the land 10 in the unrecorded recorded region NW. The detected peaked signal B has different amplitudes on opposite sides of the boundary between the recorded and unrecorded regions AW, NW, as shown in FIG. 4(B), since the envelope amplitude does not vary in the unrecorded region NW as the signal from the optical pickup has no bottom level (negative peak level) in the unrecorded region NW. As a result, the detected peak signal B in the recorded region AW and the detected peak signal B in the unrecorded region NW have different peak levels which differ from each other by a step Vds. Because of the step Vds, the detected peak signal B in the recorded region AW and the detected peak signal B in the unrecorded region NW have different DC levels, respectively. The different DC levels cause the comparator 4 to fail to produce a correct on-track signal C when it compares the detected peak signal B in the recorded region AW and the detected peak signal B in the unrecorded region NW with the reference voltage $V_{REF}$, resulting in an miscount of information tracks traversed by the optical pickup. Therefore, it is necessary that DC component contained in the detected peak signal be quickly absorbed or removed at the boundary between the recorded and unrecorded regions AW, NW.

SUMMARY OF THE INVENTION

It is an object of the present invention to provide an information reading device with a track crossing detector for preventing the DC level of a detected peak signal from varying at the boundary between recorded and unrecorded regions of an optical disk, so that an optical pickup can jump over information tracks on the optical disk for smooth track searching operation.

To achieve the above object, there is provided a device for reading information from an optical disk having recorded and unrecorded regions on a recording surface thereof with a light beam reflected from the recording surface, to produce an information signal indicative of the read information, the device comprising a peak level detector for detecting a peak level of the information signal to produce a peak level signal indicative of the detected peak level, a coupling capacitor connected to an output terminal of the peak level detector, a comparator connected to the coupling capacitor, for comparing a signal having passed through the coupling capacitor with a reference voltage, to produce a pulse signal indicative of the result of comparison, and a resetting circuit for detecting a boundary between the recorded and unrecorded regions of the optical disk based on the peak level signal, and for discharging charges stored by the couping capacitor when the boundary is detected.

The peak level detector produces a detected peak signal indicative of a peak level of the information signal, and applies the detected peak signal through the couping capacitor to the comparator. When an optical pickup traverses the boundary between the recorded and unrecorded regions on the optical disk, the resetting circuit discharges the charges stored by the coupling capacitor based on the detected peak signal.

Since the charges stored by the coupling capacitor are discharged by the resetting circuit when the boundary between the recorded and unrecorded regions is detected, a DC component contained in the detected peak signal can be removed. Therefore, the detected peak signals in the recorded and unrecorded regions are caused to vary in amplitude across a common reference level. The comparator thus produces a correct pulse signal, allowing information tracks on the optical disk to be counted accurately when they are searched or quickly traversed by the optical pickup in track searching operation.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

In the accompanying drawings:

FIGS. 3(A) through 3(C) are diagrams illustrative of signals produced by the track crossing detector shown in FIG. 2 when information tracks with recorded pits on the optical disk are traversed by an optical pickup;

FIGS. 4(A) and 4(B) are diagrams illustrative of signals produced by the tracks in recorded and unrecorded regions on the optical disk are traversed by an optical pickup;

FIG. 5 is a block diagram of a track crossing detector according to the present invention; and FIGS. 6(A) through 6(D) are diagrams illustrative of signals produced by the track crossing detector shown in FIG. 5.

DETAILED DESCRIPTION OF THE PREFERRED EMBODIMENT

Figure 1:
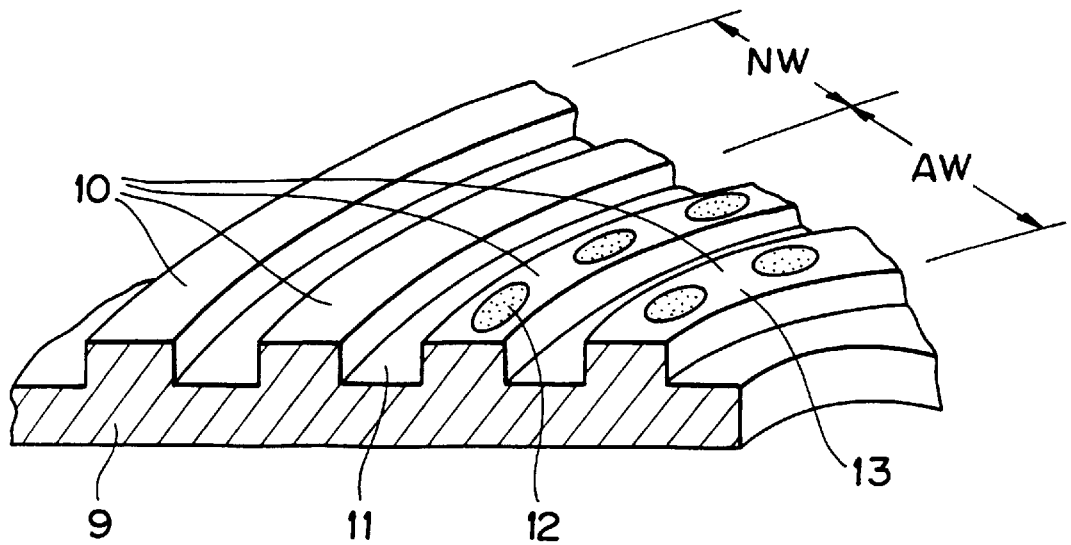
FIG. 1 is a fragmentary perspective view, partly in cross section, of a WORM optical disk.

FIG. 5 shows a track crossing detector according to the present invention. Those parts shown in FIG. 5 which are identical to the corresponding parts shown in FIG. 2 are denoted by identical or corresponding reference characters, and will not be described in detail.

Figure 2:
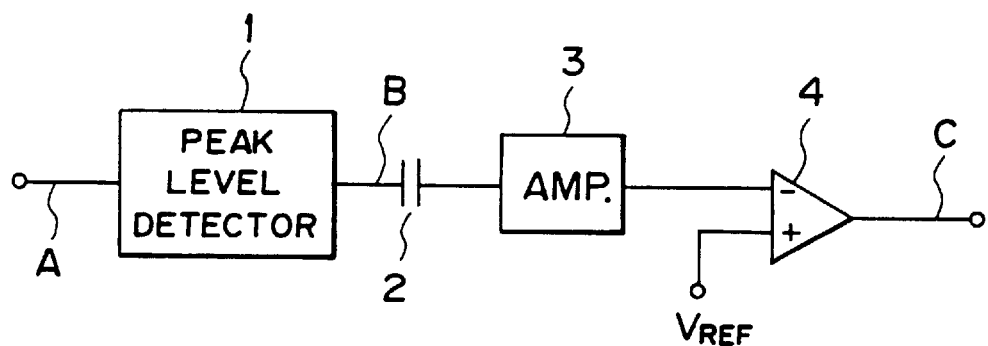
FIG. 2 is a block diagram of a conventional track crossing detector.

The track crossing detector shown in FIG. 5 differs from the conventional track crossing detector shown in FIG. 2 in that a resetting circuit is added to the track crossing detector. More specifically, as shown in FIG. 5, the resetting circuit comprises a peak level detector 5 connected to the input terminal of the peak level detector 1, for detecting a peak level $V_P$ of the RF signal A, a bottom level detector 6 also connected to the input terminal of the peak level detector 1, for detecting a bottom level $V_B$ of the RF signal A, a comparator 7 for determining the difference between the peak level $V_P$ from the peak level detector 5 and the bottom level $V_B$ from the bottom level detector 6, and for producing a reset pulse E when the determined difference is substantially zero or less than a predetermined small value, and a resetting transistor 8 which is turned on by the reset pulse to discharge the stored charges of the coupling capacitor 2 to ground. The peak level detector 5 may be a unipolar peak level detector comprising an operational amplifier. The bottom level detector 6 may also be a unipolar peak level detector comprising an operational amplifier, the unipolar peak level detector having a rectifying diode which is directed in reverse relationship to the rectifying diode of the unipolar peak level detector as the peak level detector 5. The comparator 7 may comprise an operational amplifier serving as a subtractor in which an output signal is reversed. The resetting transistor 8 may comprise a switching NPN-type bipolar transistor. The resetting transistor 8 may also comprise a PNP-type bipolar transistor which can be turned on by the reset pulse E of opposite polarity. The peak level detector 5, the bottom level detector 6, and the comparator 7 jointly serve as a boundary detector.

Operation of the track crossing detector shown in FIG. 5 will be described below with reference to FIGS. 6(A) through 6(D). During normal reading operation, the track crossing detector operates in the same manner as described above with reference to FIGS. 2 and 3(A) through (C).

In track searching operation, when the optical pickup jumps over information tracks as it traverses the recorded region AW on the optical disk 9 (FIG. 1), the RF signal A produced by the optical pickup contains an RF component. Since the peak level $V_P$ and the bottom level $V_B$ of the RF signal A differ from each other, the comparator 7 does not produce a reset pulse E, and the resetting transistor B remains nonconductive.

When the optical pickup reaches the boundary between the recorded and unrecorded regions AW, NW and then travels in the unrecorded region NW, no RF component is contained in the signal from the optical pickup, and the signal from the optical pickup has a waveform in the unrecorded region NW as shown in FIG. 6(A). Since there is no difference between the peak level $V_P$ and the bottom level $V_B$ at this time, the detected output signals from the peak and bottom level detectors 5, 6 are substantially equal to each other, and the comparator 7 produces a reset pulse E as shown in FIG. 6(D). The resetting transistor 8 is now rendered conductive by the reset pulse E, whereupon the terminal of the coupling capacitor 2 which is connected to the amplifier 3 is connected to ground for an interval of time that is determined by the pulse duration of the reset pulse E. As a result, a DC level $V_{DC2}$ (FIG. 6(B)) of the detected peak signal B that is stored in the coupling capacitor 2 in the unrecorded region NW is discharged to ground through the resetting transistor 8. Therefore, as shown in FIG. 6(C), the amplifier 3 is supplied with a corrected signal D that varies in amplitude across a reference level of 0 V in the recorded and unrecorded regions AW, NW. The amplifier 3 thus applies a signal with no DC offset, similar in waveform to the corrected signal D, to the comparator 4. The signal applied to the comparator 4 has the same reference level (0 V) in the recorded and unrecorded regions AW, NW. Accordingly, the on-track signal C produced by the comparator 4 is indicative of accurate track count pulses, preventing a miscount of information tracks traversed by the optical pickup.

While the present invention has been described with respect to a WORM optical disk, the principles of the invention are also applicable to a rewritable optical disk.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A device for reading information from an optical disk having recorded and unrecorded regions on a recording surface thereof with a light beam reflected from the recording surface, to produce an information signal indicative of the read information, said device comprising:

a peak level detector for detecting a peak level of the information signal to produce a peak level signal indicative of the detected peak level;

a coupling capacitor connected to an output terminal of said peak level detector;

a comparator connected to said coupling capacitor, for comparing a signal having passed through said coupling capacitor with a reference voltage, to produce a pulse signal indicative of the result of the comparison; and a resetting circuit for detecting a boundary between the recorded and unrecorded regions of the optical disk based on said peak level signal during track search operation in which said light beam travels in a radial direction of the disk, and for discharging any charges stored by said coupling capacitor when the boundary at the beginning of the unrecorded region is detected.

2. A device according to claim 1, wherein the optical disk has a mirror-finish spiral land serving as an information track, along which the information can be recorded, said spiral land extending spirally from an inner circumferential side to an outer circumferential side thereof in the recorded and unrecorded regions.

3. A device according to claim 1, wherein said resetting circuit comprises:

a boundary detector for producing a boundary signal indicative of the boundary between the recorded and unrecorded regions; and a switching circuit for discharging the charges stored by said coupling capacitor in response to the boundary signal.

4. A device according to claim 3, wherein said switching circuit comprises a component that can be rendered conductive in response to the boundary signal.

5. A device according to claim 3, wherein said boundary detector comprises:

a peak level detector for detecting a peak level of the information signal to produce a peak level signal indicative of the detected peak level;

a bottom level detector for detecting a bottom level of the information signal to produce a bottom level signal indicative of the detected bottom level; and a comparator detector for detecting the difference between said peak level signal and said bottom level signal, and for producing a reset pulse when the detected difference is substantially zero.

6. A device according to claim 3, wherein said switching circuit has a terminal connected to a terminal of said coupling capacitor which is connected to said comparator and another terminal connected to ground.

7. A device according to claim 3, wherein said switching circuit comprises a transistor that can be rendered conductive in response to the boundary signal.

* * * * *